(12) United States Patent
Buckner et al.

(10) Patent No.: US 11,096,258 B2
(45) Date of Patent: Aug. 17, 2021

(54) LIGHTING SYSTEM WITH USAGE MODELING

(71) Applicant: iLumisys, Inc., Troy, MI (US)

(72) Inventors: Christian Buckner, Troy, MI (US); James R. Scapa, West Bloomfield, MI (US)

(73) Assignee: iLumisys, Inc., Troy, MI (US)

( * ) Notice: Subject to any disclaimer, the term of this patent is extended or adjusted under 35 U.S.C. 154(b) by 308 days.

(21) Appl. No.: 16/378,137

(22) Filed: Apr. 8, 2019

(65) Prior Publication Data

US 2020/0323053 A1 Oct. 8, 2020

(51) Int. Cl.
*H05B 47/105* (2020.01)
*H05B 47/19* (2020.01)

(52) U.S. Cl.
CPC .......... *H05B 47/105* (2020.01); *H05B 47/19* (2020.01)

(58) Field of Classification Search
CPC ...... H05B 47/105; H05B 47/19; H05B 47/14; H05B 47/18; H05B 47/155; Y02B 20/40; Y02B 70/30; Y04S 20/246; G06Q 10/06
See application file for complete search history.

(56) References Cited

U.S. PATENT DOCUMENTS

| | | | |
|---|---|---|---|
| 7,049,761 B2 | 5/2006 | Timmermans et al. | |
| 7,510,299 B2 | 3/2009 | Timmermans et al. | |
| 7,815,338 B2 | 10/2010 | Siemeit et al. | |
| 7,976,196 B2 | 7/2011 | Ivey et al. | |
| 8,093,823 B1 | 1/2012 | Ivey et al. | |
| 8,118,447 B2 | 2/2012 | Simon et al. | |
| 8,232,745 B2 * | 7/2012 | Chemel | H05B 45/10 315/308 |
| 8,247,985 B2 | 8/2012 | Timmermans et al. | |
| 8,282,247 B2 | 10/2012 | Ivey et al. | |
| 8,360,599 B2 | 1/2013 | Ivey et al. | |
| 8,368,321 B2 * | 2/2013 | Chemel | H05B 47/155 315/294 |
| 8,382,327 B2 | 2/2013 | Timmermans et al. | |
| 8,444,292 B2 | 5/2013 | Ivey et al. | |

(Continued)

FOREIGN PATENT DOCUMENTS

WO WO 2015/054611 4/2015

OTHER PUBLICATIONS

Extended European Search Report in European Appln No. 20168550.0, dated Jun. 16, 2020, 7 pages.

*Primary Examiner* — Haissa Philogene
(74) *Attorney, Agent, or Firm* — Fish & Richardson P.C.

(57) ABSTRACT

Techniques are described for managing a lighting system that includes light sources (e.g., fixtures and/or bulbs), controller(s), sensor(s), and/or other device(s). The device(s) can be monitored to determine a units metric describing the operation of the device. A units metric can indicate a current number of units for the device, where a unit is a unit of power consumed by the device, a unit of illumination provided by the device, and/or some other unit that measures the current operating state of the device. A model can be applied to control usage of the lighting system. For example, a model may provide a budget of units that the lighting system is allowed to consume at any given time. The model may also include a set of rules that constrain the operation of the lighting system, and/or that describe actions to be taken if the budget of units is exceeded.

20 Claims, 6 Drawing Sheets

(56) References Cited

U.S. PATENT DOCUMENTS

| | | |
|---|---|---|
| 8,454,193 B2 | 6/2013 | Simon et al. |
| 8,482,212 B1 | 7/2013 | Ivey et al. |
| 8,523,394 B2 | 9/2013 | Simon et al. |
| 8,573,813 B2 | 11/2013 | Ivey et al. |
| 8,596,813 B2 | 12/2013 | Ivey et al. |
| 8,678,610 B2 | 3/2014 | Simon et al. |
| 8,732,031 B2 * | 5/2014 | Martin ................... G06Q 20/14 705/26.1 |
| 8,807,785 B2 | 8/2014 | Ivey et al. |
| 8,866,396 B2 | 10/2014 | Timmermans et al. |
| 8,870,412 B1 | 10/2014 | Timmermans et al. |
| 8,870,415 B2 | 10/2014 | Ivey et al. |
| 8,894,430 B2 | 11/2014 | Simon et al. |
| 8,928,025 B2 | 1/2015 | Simon et al. |
| 9,006,990 B1 | 4/2015 | Timmermans et al. |
| 9,006,993 B1 | 4/2015 | Timmermans et al. |
| 9,072,171 B2 | 7/2015 | Simon et al. |
| 9,184,518 B2 | 9/2015 | Ivey et al. |
| 9,163,794 B2 | 10/2015 | Simon et al. |
| 9,271,367 B2 | 2/2016 | Ivey et al. |
| 10,057,966 B2 * | 8/2018 | Amrine ................ H05B 45/12 |
| 10,264,652 B2 * | 4/2019 | Chemel ................ H05B 47/115 |

* cited by examiner

LIGHTING SYSTEM WITH USAGE MODELING

BACKGROUND

Lighting fixtures are ubiquitous in a variety of settings, including residences, workplaces, social spaces, businesses, and so forth. Traditionally, an individual or organization seeking to provide light in a space has purchased the desired light fixtures (e.g., lamps) and/or bulbs and installed them in suitable locations to provide the desired illumination. Following installation, the individual or organization operates the light fixtures as they see fit, and they are typically charged by a utility company for the power consumed by the fixtures. Fixtures and bulbs can be occasionally replaced or repaired as needed, entailing additional expenditures.

Moreover, similar resource management challenges may be present in other types of environments, such as Internet-of-Things (IoT) networks, industrial controls settings, autonomous vehicle systems, home or workplace utility management systems, broader (e.g., city-wide) utility management systems, and so forth.

SUMMARY

Implementations of the present disclosure are generally directed to managing a system of nodes. More specifically, implementations provide a lighting system that allows for management of each lighting device and/or other devices in the lighting system based on a model that specifies a set of rule(s) that may be associated with a particular entity, in which the rule(s) include a constraint on a number of units that can be consumed by the device(s) in the system, and in which a unit can be a unit of illumination (e.g., lumen), a unit of power consumption (e.g., watt), and/or some other unit related to operation of the device.

Implementations may include methods that include one or more of the following operations: accessing usage data indicating, for each of a plurality of devices in an environment that includes a lighting system, a units metric describing a current operation of a respective device of the plurality of devices; accessing a model that includes one or more rules that constrain usage of the lighting system; applying the one or more rules to the usage data; and dynamically performing at least one action based on a result of applying the one or more rules to the usage data.

Implementations may optionally include one or more of the following aspects: the units metric indicates: an amount of power currently consumed by the respective device, an amount of illumination currently provided by the respective device, and/or a combination of the amount of power and the amount of illumination; the one or more rules include a rule constraining a total of the units metrics for the plurality of devices according to a maximum units parameter for the lighting system; the result indicates that the total of the units metrics exceeds the maximum units parameter; the at least one action includes transmitting a signal to alter operation of one or more of the plurality of devices to reduce the units metric of the one or more devices; the signal causes the one or more devices to shut off the one or more devices, reduce a brightness of the illumination provided by the one or more devices, and/or reduce power consumption of the one or more devices; the at least one action includes changing the maximum units parameter to be at least the total of the units metrics, and initiating a charge transaction to an entity associated with at least one of the lighting system and the environment; the maximum units parameter is changed for a limited period of time; and/or the plurality of devices includes one or more of a lighting source, a sensor, and a controller.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to techniques for managing a system of nodes through the application of rules that constrain a number of units that are consumable within the system of nodes. For some examples, the nodes can be: Internet-of-Things (IoT) devices, such as a system of smart appliances in the home or elsewhere; industrial controls, machines, and/or other devices in an industrial setting; devices within a heating, ventilation and air conditioning (HVAC) system, power distribution system, or other type of utility system on any appropriate scale; vehicles in a managed pool of autonomous, semi-autonomous, or human-controlled vehicles; and so forth. In these and other examples, the units consumable within the system can be units of electrical power, fuel, and/or some other suitable measure of usage of the nodes.

In some implementations, the managed system of nodes is a lighting system, the nodes are devices within the lighting system (e.g., fixtures and/or bulbs), and the units are units of power and/or units of illumination. Implementations also operate within other types of environments to manage other types of resources, as described further herein. Accordingly, implementations also support other types of units, such as units that measure levels of comfort, health, and so forth. A lighting system can include any suitable number of devices, such as light sources (e.g., fixtures and/or bulbs). The devices can also include controller(s) for controlling operation of the light sources, sensor(s) to sense the presence of people in a space and/or to sense other environmental conditions, and/or other device(s). One or more of the device(s) can be monitored (externally and/or by the device itself) to determine a units metric describing the operation of the device. In some implementations, a units metric can indicate a current number of units for the device, where a unit is a unit of power consumed by the device (e.g., watts), a unit of illumination provided by the device (e.g., lumens), and/or some other unit that measures the current operating state of the device. An entity associated with a lighting system (e.g., a customer) can be associated with a model that indicates how the lighting system can be used. For example, a model may provide a budget of units that the lighting system is allowed to consume at any given time, such as a total number of watts that may be consumed by the lighting system, a total number of lumens that may be generated by the lighting system, and so forth. The model may include a set of rules that constrain the operation of the lighting system, and/or that describe actions to be taken if the budget of units is exceeded, for example. In some instances, a rule may indicate that, if a total units metric is exceeded in the system, an action is automatically performed to reduce the total units metric by shutting off one or more devices, reducing the illumination or power consumption of one or more devices, and/or other action(s).

In this way, implementations support a unit model for lighting within a space, which can provide lighting as a service (LaaS). According to such a model, an entity (e.g., customer) may enter into an arrangement with a lighting service provider under which the entity agrees to pay a (e.g., monthly, yearly, etc.) subscription fee in return for a budget of units that the entity is allowed to consume within their lighting system. The units budget can be used in any of the devices within the lighting system, and can be shifted between devices to achieve the entity's desired lighting result at any time. If the entity exceeds their allocation of units, the entity may be charged an additional amount, the entity's subscription rate (and units budget) may be increased, devices may be automatically dimmed or shut down to stay within the budget, and/or other actions may be taken.

The lighting system described herein can be a network of devices that communicate (e.g., wirelessly) to provide fine-grained and configurable control of the lighting in an area such as a room, floor of a building, whole building, outdoor space, an area that includes multiple buildings without or without outdoor space, and so forth. In some implementations, the control of the lighting system may be independent of the electrical scheme in the area, apart from the use of power that may be provided by the area's electrical scheme. The light sources can be controlled independently, allowing variation in the amount of light in various rooms or other areas.

Implementations provide for the control of individual light sources and/or the control of groups of light sources, with such control being based at least partly on a model as described herein. In some instances, light sources are bulbs (alternatively referred to as lamps) that fit within conventional light fixtures (e.g., via bi-pin connectors, screw connectors, or bayonet connectors), and such light source(s) may be wirelessly connected to daylight and/or occupancy sensors, as well as to multi-scene controllers (e.g., wall switches), allowing for individual control of each light source and/or control of configured groups of light sources.

As discussed herein, various suitable types of units metric can be measured and used to govern the operation of devices within the system. For example, a units metric can measure the amount of power consumed by device(s) in a system, or an amount of illumination provided by device(s) in a system. In some implementations, the units metric can measure a level of comfort, satisfaction, and/or happiness that is expressed by the occupants of the environment (e.g., tenants of a building) through surveys or other information-gathering channels.

Figure 1:
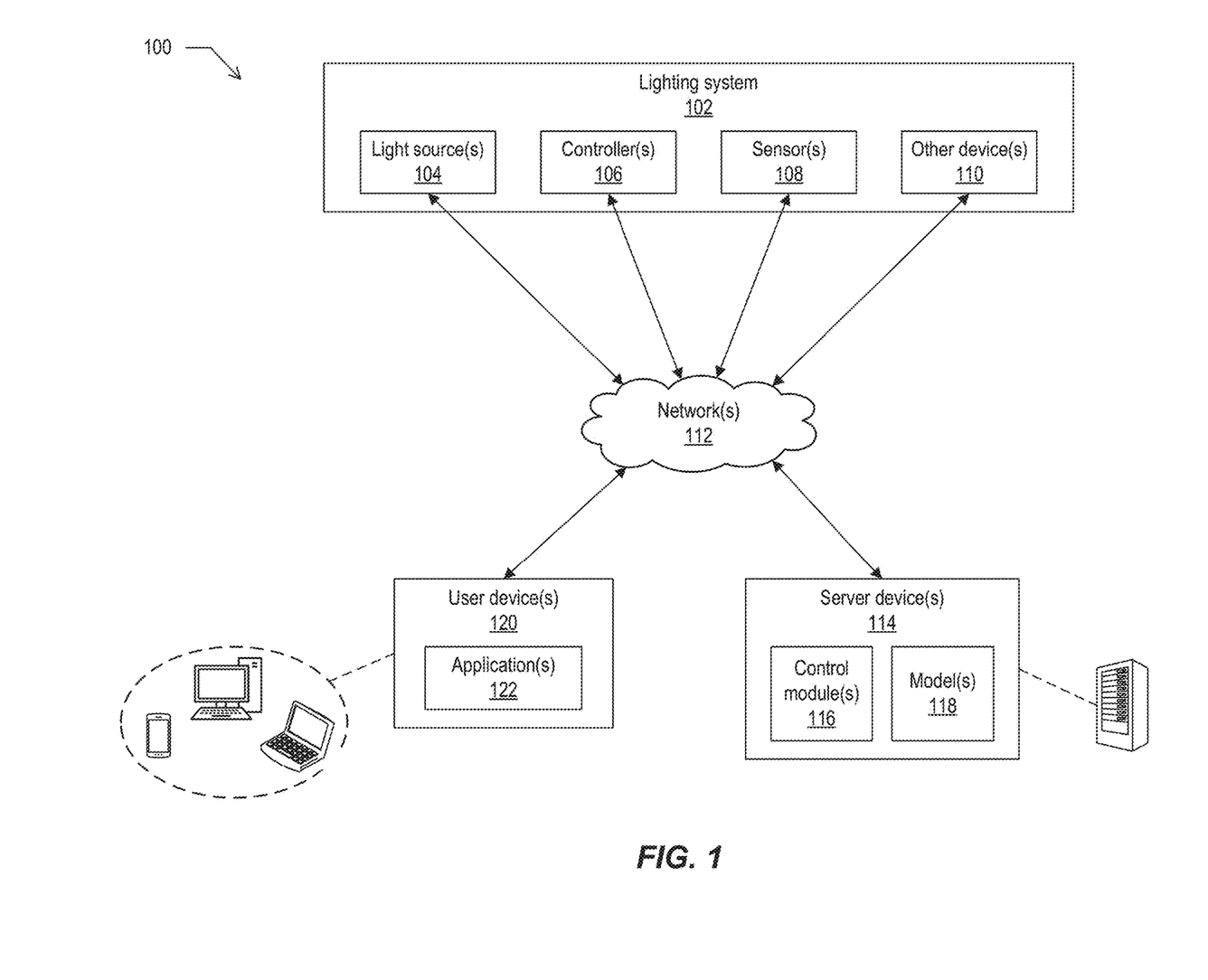
FIG. 1 depicts an example environment in which a lighting system is managed according to model(s), according to implementations of the present disclosure.

FIG. 1 depicts an example environment 100, according to implementations of the present disclosure. The environment 100 can include a lighting system 102. In some implementations, the environment 100 and/or the lighting system 102 includes elements as described in U.S. Pat. No. 10,057,966, titled "Connected Lighting System," the entire contents of which are incorporated by reference into the present disclosure. The system 102 can be in an indoor space, such as a room or other portion of a building, or the entire building, an office, a home, and so forth. The system 102 may also be in a space that is at least partly outdoors, such as in a yard, park, stadium, open-air amphitheater, an area that includes outdoor space with one or more buildings, and so forth. In some examples, the system 102 is present in another setting such as within a vehicle. Implementations are applicable within a smart buildings and/or an IoT environment, and in other settings as well. For example, implementations are applicable for asset tracking, transportation (e.g., electric cars, public transportation, autonomous vehicles, etc.), logistics settings, energy settings, and/or any other appropriate area that is network accessible. Implementations can also be applied at any suitable scale, including the scale of a room or building as well as a more macro scale, such as across a neighborhood, town, city, and so forth.

The lighting system 102 can include various types of device, such as light sources 104, controller(s) 106, sensor(s) 108, and/or other device(s) 110. The device(s) of the lighting system 102 are communicatively coupled, over one or more networks 112, to various computing device(s) that may be present in the environment 100, including user device(s) 120 and/or server device(s) 114. The user device(s) 120 can be any suitable type of computing device, including portable device(s) (e.g., smartphone, tablet computer, wearable computer, etc.) as well as less portable types of device(s) (e.g., desktop computer, laptop computer, etc.). The user device(s) 120 can execute application(s) 122 that provide functionality for operating the device(s) in the lighting system 102 and/or receiving and presenting information from the device(s) in the lighting system 102. The server device(s) 114 can include any suitable number and type of computing device(s), and may include distributed computing device(s) (e.g., cloud computing server(s)). In some examples, the server device(s) 114 can be physically remote from the user device(s) 120 and/or the lighting system 102, and may communicate with the user device(s) 120 and/or the lighting system 102 over a wide area network (WAN) 112 such as the Internet. The server device(s) 114 can execute one or more control module(s) 116 that control operation of the lighting system 102 and/or perform action(s) based on the application of one or more model(s) 118, as described further herein. The model(s) 118 may be stored on the server device(s) 114 or elsewhere.

In general, each light source 104 is a device configured to emit light (e.g., at least partly in the visible spectrum). Examples of light sources include LED bulb(s), incandescent bulb(s), fluorescent bulb(s), gas lamps and/or other suitable types of light emitting devices. The light source(s) 104 may also include organic LEDs, which use an organic substance as a semiconductor material in a light emitting diode.

In some examples, a light source 104 is part of a light fixture (luminaire). The light fixture refers to the light source and all components directly associated with the distribution, positioning, and protection of the light source. In some examples, a light fixture may include one or more light sources 104. The light sources may connect to the fixture via a standard bulb connector (in which case the light source may be a replacement bulb) or the light source may be integrally formed with the light fixture. Standard bulbs may include, but are not limited to, fluorescent (e.g., T8) bulbs, Edison bulbs, parabolic aluminized reflector (PAR) bulbs, and so forth. A light fixture may be controllable, along with the various bulbs in the fixture, and/or individual bulbs may be individually controllable.

In some examples, light sources 104 may be in the form of a tube (e.g., a fluorescent tube or an LED fluorescent replacement tube). Each light source 104 may include an internal driver that regulates and/or modulates the light source's brightness, or otherwise controls the state of the light source. Examples of LED light sources for fluorescent tube replacement and associated manufacturing methods are described further in U.S. Pat. Nos. 7,049,761; 7,510,299; 7,815,338; 7,976,196; 8,118,447; 8,093,823; 8,247,985; 8,282,247; 8,360,599; 8,382,327; 8,444,292; 8,454,193; 8,482,212; 8,523,394; 8,573,813; 8,596,813; 8,678,610; 8,807,785; 8,870,415; 8,870,412; 8,866,396; 8,894,430; 8,928,025; 9,006,990; 9,006,993; 9,072,171; 9,163,794; 9,184,518; and 9,271,367; the entire contents of each of these patents are incorporated herein by reference.

In some instances, all of the light sources 104 in lighting system 102 may have the same form factor or different form factors can be used in the same system. For example, in some embodiments, some of the light sources are tubes while others are PAR bulbs and/or Edison bulbs. Lighting system 102 can also include light fixtures for replacement bulbs, light fixtures with integrated light sources, or both types of light fixture. Although examples herein may describe light sources 104 as bulbs that are fluorescent replacement tubes, other bulb form factors are also possible. For example, A-series bulbs, B-series bulbs, C-7/F series bulbs, MR series, and/or PAR bulbs can also be used.

In addition to an internal driver, each light source 104 may include, or be communicatively coupled to, a wireless radio (e.g., transceiver) that allows the light source to receive and transmit wireless signals. The wireless radio may be integrally formed with the light source or otherwise in communication (e.g., electrical or wireless communication) with the associated light source. The wireless radio may be in communication with the internal driver, allowing the operation of the light source to be wirelessly controlled as described herein. In some examples in which a light source is a replacement bulb, the wireless radio can be included as part of the electrical components in the replacement bulb. In some examples, the wireless radio is part of a light fixture that may be configured to receive replacement bulbs, or may have light sources integrated therein.

The controller(s) 106 can any suitable number and type of controller(s) that are usable to control operations of the light source(s) 104, including fixed (e.g., wall-mounted) controller(s) and/or portable controller(s). During operation, the light source(s) 104 may be controlled from the controller(s) 106 over a wireless network. In particular, operating the various switches on a controller 106 can cause the controller 106 to send wireless signals to the wireless radios of the light sources 104, causing one or more of the light source(s) 104 to modify their brightness setting as appropriate. Control signal(s) may also be sent over wired network connections in some instances. For example, all the light source(s) 104 in the system 102 may be switched on or off using on-off switch of the controller 106, which may cause a signal to be sent over a wired or wireless network to control the light source(s) 104. The light source(s) 104 may be collectively dimmed or brightened using the dimmer switches of the controller 106.

The system 102 may also include one or more sensors 108. The sensor(s) 108 may include a wireless radio (e.g., transceiver) for communication with the light source(s) 104 and/or controller(s) 106. Implementations support the use of any suitable number and type of sensor(s) 108. For example, the sensor(s) 108 may include motion, sound, and/or heat sensors that determine when an area (e.g., a room) is occupied by individual(s). The sensor(s) 108 may also include light level sensor(s) that detect the brightness of ambient light in the area. In some implementations, the operation of the light sources 104 may be modified based on wireless signals from a sensor 108, e.g., based on ambient light level(s) and/or area occupancy. For example, the light sources 104 can be switched on or off, or dimmed or brightened, based on signals from an occupancy sensor 108, where such signals are sent based on whether someone is in a room or whether the room is unoccupied. As another example, the light sources 104 can be switched on or off, or dimmed or brightened, based on signals from an ambient light sensor, where such signals are sent based on the amount of ambient light detected in the area. In some implementations, at least one of the light sources 104 may include one or more of the sensors 108, such as occupancy sensor(s), ambient light level sensor(s), and so forth. The sensor(s) 108 may also be external to the light source(s) 104.

In some implementations, the environment 100 includes one or more other devices 110 such as electrical module(s) that close the circuit delivering electrical power from the area's electrical system to the fixtures housing the light source(s) 104. This may be the case in examples where the light source(s) include bulb(s) that are installed into fixture(s), so that at least some (or all) of the light sources 104 in the light fixtures always receive electrical power. Also, the environment 100 can include conventional wall switches, which open or close the circuit to turn lights off or on. An electrical module may also include a wireless radio (e.g., transceiver), allowing for wireless communication between the controller(s) 106 and the light source(s) 104.

The network(s) 112 can include any suitable wired and/or wireless network(s) that employ any suitable communication protocol. For example, the wireless radios of one or more components described herein may be configured to operate using any suitable version of wireless DALI, IEEE 802.11, Wi-Fi, Bluetooth, Bluetooth Low Energy (BTLE). Other wireless protocols may also be used, such as LORAWAN, ZigBee, Z-Wave, proprietary protocols, and so forth. The wireless radios may operate using radio frequency (RF) channel(s), or through infrared, ultrasonic or modulated visible light, such as light emitted from the LED bulbs with high frequency modulation. In some examples, the wireless radios in the light source(s) 104, controller(s) 106, sensor(s) 108, and/or other device(s) 110 may form a wireless mesh network that extends the range of the wireless communication system over the entire area (e.g., an entire room, building, etc.). This can be beneficial in large rooms, such as storage warehouses, where the extent of the space to be lit can exceed the range of the wireless communication protocol being used. For example, Bluetooth communications may have a range of up to 30 feet, and the wireless mesh network may enable communications over significantly longer distances.

The user device(s) 120 may include a wireless radio (e.g., transceiver) that enable the user device(s) 120 to communicate using the same wireless communication protocol as the light source(s) 104, the sensor(s) 108, the controller(s) 106, and/or the other device(s) 110 in the system 102. Accordingly, the user device 120 may be used to control and/or configure the operation of the light sources 104 in the lighting system 102. In some implementations, the user device 120 may execute an application 122 (e.g., an app) that enables the operation and/or configuration of the light sources 104 in the system 102. The application 122 can include a user interface (UI) that may be manipulated through a touchscreen or other input components of the user device 120. The UI may, in some instances, imitate the layout of the switches on the controller(s) 106. In this way, a user can operate the connected lighting system 102 using the user device 120 in a manner that is the same or similar to the way in which the user would use the controller(s) 106.

In some implementations, BTLE may be used for communications between components of the environment 100. A Cambridge Silicon Radio (CSR) Mesh network, or other suitable mesh-based communications protocol, may operate on top of BTLE and enable communications over a wider range than is possible using BTLE alone, as described above. Various messages may be sent over the mesh network to enable control of the light sources 104. For examples, messages may be sent to control brightness of light sources 104. For example, a whole building may be encompassed by a mesh network, and various groups could be defined to address individual rooms or other portions of the building. In general, a group may be defined to include any logical portion of a building, room, or other area. Different sets of light sources 104 may be defined as different groups. The application 122 and/or controller(s) 106 may be used to control individual light source(s) 104 and/or groups of light sources 104.

The control module(s) 116 may receive usage data from the various device(s) in the lighting system 102, analyze the usage data, and perform action(s) based on the analysis. The usage data can indicate a number of units being currently consumed by each device, for example the current power consumption of the device or the current illumination generated by the device. Alternatively, the usage data can describe the current operating conditions of the device(s) (e.g., power consumption, illumination generated, etc.), and the control module(s) 116 may determine the units metric (e.g., number of units being consumed) for each device based on the usage data. The control module(s) 116 can apply the model 118 for an entity (e.g., customer) associated with the lighting system 102 to determine action(s) to be performed to control the lighting system 102.

In some implementations, the control module(s) 116 may include a learning component that adjusts the lighting based on learned aspects of individual behavior. For example, the learning component may receive sensor data from the sensor(s) 108 indicating when an area is occupied by one or more persons and/or when the ambient light in an area is at a particular level. As a particular example, the learning component may determine that an individual tends to enter an area (e.g., room, building, etc.) at approximately 7:13 a.m. each Wednesday. The lighting environment may be automatically adjusted accordingly, to ensure that there is adequate light in an area when the individual arrives.

In some implementations, the control module(s) 116 take into account the level of ambient light (e.g., available from daylight), as well as a user-selected dimming setting, to determine a power level and/or brightness at which to operate the light sources 104. In some implementations, the level settings for light source(s) 104 may be adjusted over time based on user inputs. Accordingly, the learning component may learn the lighting levels preferred by the user at various times of the day (or days of the week, month, etc.), and automatically adjust to provide the lighting levels adapted by the particular user. Moreover, in some implementations the learning component may take into account power savings considerations when determining the level(s) of light source(s) 104 at various times. For example, the learning component may recognize patterns of when a user is present or not present in a particular space. Light source(s) 104 may be turned off and/or set to a reduced brightness level at those times when the user is not likely to be present, and/or light source(s) may be turned on and/or set to a typical brightness level for room usage at those times when the user is likely to be present, as determined based on the previously detected patterns.

The device(s) in the lighting system 102 can be controlled through sending message(s), over the network(s) 112, to the various device(s). In some implementations, the message(s) may originate from the server device(s) 114 and be conveyed to the device(s) in the lighting system 102 via a network node that is in communication with both the server device(s) 114 and the device(s) in the lighting system 102. In some implementations, each device may have a unique address (e.g., BlueTooth address) on the mesh network. A message may be broadcast to the entire mesh network, and the message may be addressed to a particular device or set of devices. For a message addressed to a device, the device may recognize its address and respond appropriately according to the contents of the message. For a message addressed to a group of device, each recipient of the message may determine whether it is part of the group and, if so, the recipient device may respond appropriately according to the contents of the message. Because each device can store information indicating what group(s) it is in, the messages may include a minimal amount of data.

Figure 2:
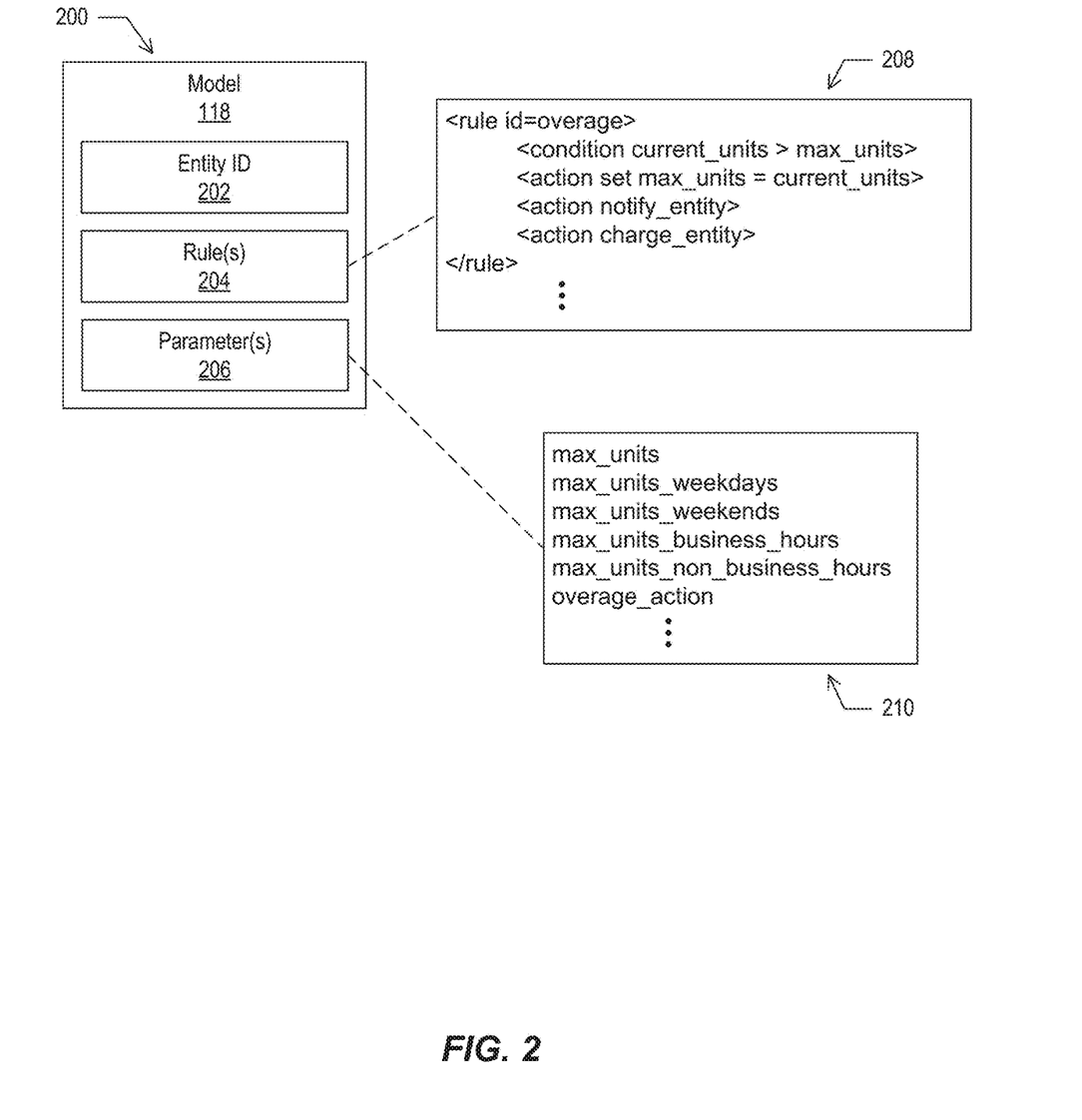
FIG. 2 depicts an example of a model that can be used to manage a lighting system, according to implementations of the present disclosure.

FIG. 2 depicts an example 200 of a model 118 that can be used to manage a lighting system 102, according to implementations of the present disclosure. The model 118 may be associated with a particular entity (e.g., a customer) and may be used to control a lighting system 102 of the entity. The model 118 may include an entity identifier (ID) 202 that identifies the associated entity. The model 118 may include one or more rules 204 that govern the usage of the devices in the lighting system 102. The model 118 may also include one or more parameters 206 that are established for the entity, and that are used by the rule(s) 204.

Example 208 shows an example of a rule 204 expressed using a markup language or other suitable format. Implementations support the use of any suitable format for describing the rule(s) 204. In this example, a rule governing an overage condition is specified, in which an action is performed based on determining that the total units metric for the devices in the system 102 exceeds a maximum units parameter for the entity. In this example, the action(s) performed are to set the maximum units parameter to the current units being consumed, perform a transaction to charge the entity (e.g., an increased subscription fee for higher usage), and notify the entity (e.g., by email or other channel) of the increased budget and charge.

Example 210 shows various parameters that may be set for the entity, including a maximum units parameter indicating a units budget that has been allocated for use in the lighting system 102. Parameters can also include action(s) to be performed in particular circumstances, based on the rules. In some examples, a maximum units parameter (e.g., units budget) may be specified for different time periods or situations, such as different maxima for weekdays versus weekends, business hours versus non-business hours, and so forth. Other parameters may also be used, as appropriate.

Implementations provide a model that may govern, for a particular lighting system 102 of an entity, a number of units that may be concurrently in use by the lighting system 102. The entity may subscribe to a service, e.g., to access LaaS. The service provider may supply the entity with a suitable number of devices (e.g., light sources, sensors, controllers, etc.) for their environment, and the entity may agree to a subscription fee for a certain budget of units that may be expended at various times. In some examples, the units may be expended anywhere in the lighting system 102, providing for what may be described as a units float. For example, if a light is turned on, another light may be turned off to avoid exceeding the allocated units budget. In some instances, the lighting may be adjusted in more gradual increments instead of, or in addition to, adjusting some lighting by turning on or turning off completely. For example, consumption of power or other metrics may be reduced through some combination of dimming lights, reducing HVAC use, and so forth. The entity can be charged a price per concurrent units usage for a period of time (e.g., per month, per year, etc.). As an example, where units are lumens of illumination, the subscription may provide for a minimum number of lumens per device to be 800, and the entity can be charged half a cent per lumen per year, or 4 US dollars (USD) per device per year. As another example, an entity (e.g., a building customer) can buy 1000 linear lamps, 100 down lights, 100 sensors, and 50 controller switches, for a total device count of 1250. A minimum purchase for the LaaS may be 4 USD multiplied by 1250, or 5000 USD per year.

Using the application and/or other software, as described above, the entity can configure the light sources to activate in response to sensor-detected motion and/or based on an amount of ambient daylight that is present. Certain light sources may be prioritized over others, and/or light sources can be scheduled to turn on, turn off, or adjust brightness at various times. In some implementations, if the maximum budget of units is exceeded at any time, the control module(s) 116 can send signal(s) that cause one or more devices to turn off or decrease brightness, such that the total units being spent stays within the allocated units budget. In some implementations, an overdraft may be permitted (e.g., budget overage) if the entity opts to purchase more units and/or increase their subscription to access more units.

Implementations operate to limit the amount of energy the lighting system consumes while maintaining an appropriate amount and quality of light and comfort for the occupants of the environment. For example, an entity's energy bill could move into a higher per watt payment tier at 15,000 watt-hours, and in response they may purchase 14,900 watt units from the service provider. The control module(s) can operate to ensure that they are not charged at the higher rate for an overage, by intelligently reducing energy expenditure in high-use areas as the budgetary limit is approached. Accordingly, use of implementations to control a lighting system 102 provide for greater efficiency in energy expenditure and resource allocation compared to previously available systems.

In some examples, an entity can purchase a set of devices which they can use to implement their preferred smart lighting system. The devices can consume units when they are active (e.g., consuming power and/or generating illumination), and the control module(s) can monitor their consumption relative to the budgeted allocation of units for the entity. When a device becomes inactive, the units that the device was using can then be used by some other device, providing a units float.

A device may be active if it is in use. For the lumens-type model (e.g., a unit is a unit of illumination), a device may be active when it is producing lumens. For the power-type model (e.g., a unit is a unit of power), a device may be active when it is consuming power. In other models, some other definition of unit may be used. The number of units drawn can be proportional (e.g., scale linearly) to the level of use of the device. For example, if a device operating at 100% output uses 10 units, the device operating at 10% output uses 1 unit. In some cases, different types of devices may draw different numbers and/or types of units. A units metric of a device can describe a number of units being consumed (e.g., drawn, used, spent) by a particular device. The system 102 as a whole may consume a total units metric that is the sum of the units metrics of the devices in the system 102. A units parameter for the entity may indicate the budget (e.g., maximum) total units metric that the lighting system 102 is allowed to use without triggering an overage condition, which may cause an additional charge to the entity, an increase in their budget (e.g., with commensurate increase in subscription rate), and/or shut-downs of certain devices to stay within the maximum allowed units metric.

Implementations may support different types of units. For example, a unit may be a unit of illumination (e.g., a lumen), such that the units metric of a device is equal to (or proportional to) the amount of light that is output from the device. In this example, sensors and controllers may not consume units, and light sources may consume units. In a particular example, a unit may be equal to a lumen (or N lumens, where N is any suitable value).

As another example, a unit may be a unit of power consumed (e.g., a watt), such that the units metric of a device is equal to (or proportional to) the amount of power being consumed by the device. In this example, light sources, sensors, controllers, and/or other power-consuming devices may consume units if they are operating. In a particular example, a unit may be equal to a watt (or N watts, where N is any suitable value) or other power consumption measure.

Other unit definitions can also be employed. For example, an optimization units can be charged, which may be drawn each time an advanced feature (e.g., a demand response) is used. Units may also be defined based on a combination of measurable outputs. For example, a unit may be defined as some mathematical combination of lumens and watts.

Various action(s) can be performed based on a budget constraint being exceeds. For example, the entity's (e.g., monthly) unit pool limit may be increased to the in-use amount for a particular month, with an additional transaction charge to the entity. As another example, the entity's (e.g., monthly) unit pool limit may be increased for multiple months in the future, with an increase in the subscription charge, until the entity renegotiates their subscription. In other examples, the units draw from other devices can be reduced to ensure that the total units metric for the system stays within the allocated budget.

Figure 3:
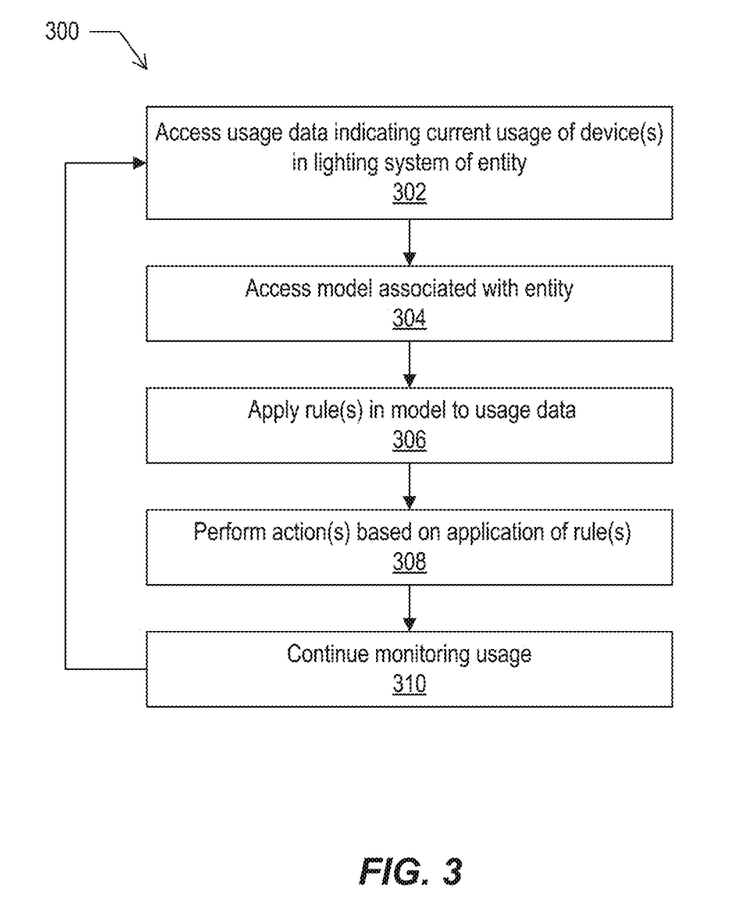
FIG. 3 depicts a flow diagram of an example process for managing a lighting system, according to implementations of the present disclosure.

FIG. 3 depicts a flow diagram 300 of an example process for managing a lighting system 102, according to implementations of the present disclosure. Operations of the process can be performed by one or more of the control module(s) 116, the application(s) 122, and/or other software module(s) executing on the server device(s) 114, the user device(s) 120, or elsewhere.

Usage data can be accessed (302), indicating a current usage (e.g., units metric) of each of the device(s) in the lighting system 102. A model 118 associated with the entity for the lighting system 102 can also be accessed (304). The rule(s) included in the model 118 can be applied (306) to the usage data, to determine whether the rules are satisfied or broken. In some implementations, rule(s) application can be periodic (e.g., every five seconds) and performed in real time with respect to the collection of the usage data. One or more action(s) can be performed (308) based on the application of the rule(s), as described above. Action(s) can be performed if rule(s) are violated, if rule(s) are satisfied, and/or different action(s) may be performed in either instance. The monitoring (310) of the usage data may continue.

In some implementations, the action(s) may be performed in real time (e.g., dynamically) with respect to the receipt and analysis of the usage data and the application of the rule(s) to the usage data. As used herein, a real time operation is an operation that is performed based on a triggering event without any unnecessary time elapsing between the triggering event and the operation, within the technical constraints of the computing system performing the operation. A real time operation may be performed within intervening human action, and may also be described as a dynamic operation or a synchronous operation.

Figure 4:
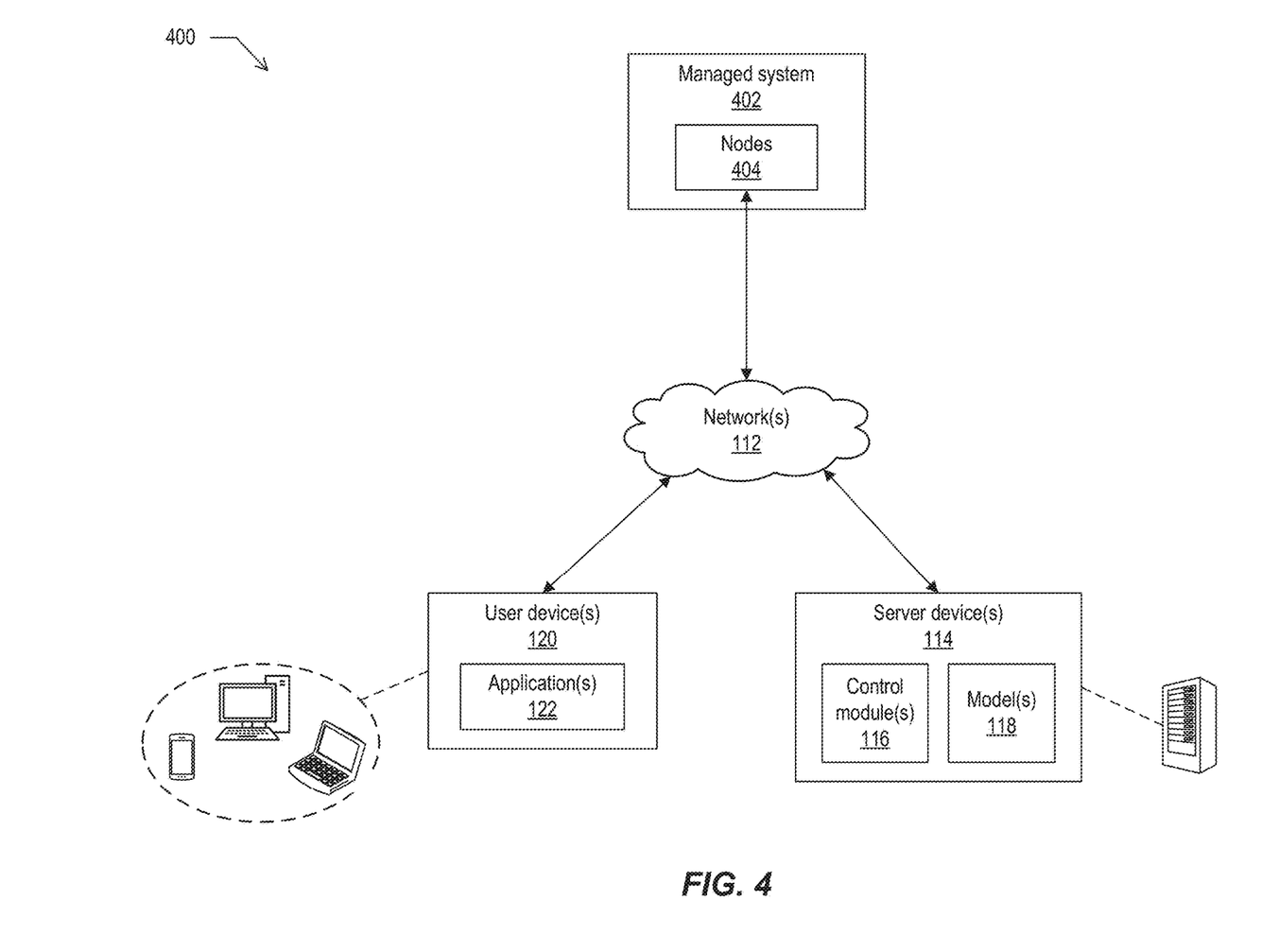
FIG. 4 depicts an example environment in which a system of nodes is managed according to model(s), according to implementations of the present disclosure.

Although examples herein describe managing a lighting system through the application of rules that constrain the operation of the lighting system, implementations are not limited to such examples. Implementations can also be employed to manage other types of systems that include other nodes (e.g., devices), in various applicable scenarios. FIG. 4 depicts an example environment 400 in which a system 402 of nodes 404 is managed according to model(s), according to implementations of the present disclosure. The managed system 402 can be the lighting system 102 as described above. The managed system 402 can also include one or more of the following:

A system of nodes that are IoT devices, such as a system of smart appliances and/or connected products in the home, workplace, or elsewhere;

A system of nodes that are industrial controls, machines (e.g., boilers, heavy machinery, etc.), and/or other devices in an industrial setting, such as a power plant, manufacturing facility, and so forth;

A system that provides utility services within an individual residence or workplace, or across a broader distribution grid that services multiple residences or workplaces, in which the nodes are individual devices or device components that provide services such as HVAC, electrical power, water, gas, network connectivity, smart building systems, and so forth; or A system of vehicles in a managed pool of autonomous, semi-autonomous, or human-controlled vehicles, such as a fleet of cars, freight-hauling trucks, trains, aircraft (e.g., drones), watercraft, and so forth.

Each of these example systems may be managed by implementations, and may or may not include the smart lighting nodes as described above. For example, implementations may be employed to managed a system of nodes within a smart building environment, using a system of wirelessly controlled devices such as smart current transformers to alter power throughout the building such that power consumptions is prevented from exceeding a certain level (e.g., budget). The control systems may control the operation of HVAC systems and/or general building circuits, such as meters or sub-meters, safety devices, security devices, and so forth. As another example, implementations can be used to manage connected electric vehicles or electric vehicle networks. In such examples, car companies or electric charging stations could license electricity use to groups on a per unit (e.g., Watt) basis. As another example, implementations can be used to manage connected products from various vendors. The controlling software (e.g., IoT software, control module(s)) could be licensed to entities who use it to enable their smart products based on the number of their customers concurrently using their products or other considerations.

The node(s) 404 in the system 402 can be controlled by sending message(s), over the network(s) 112, to the various node(s) 404. In some implementations, the message(s) may originate from the server device(s) 114 and be conveyed to the node(s) 404 via a network node that is in communication with both the server device(s) 114 and the node(s) 404, as described above. As described above, the control of node(s) 404 in the system 402 may be based on sensor data collected by sensors in the system 402. The node(s) 404 can include both the device(s) that are managed within the system as well as the sensors that monitor the managed device(s) and generate sensor data describing their state and/or operations.

Figure 5:
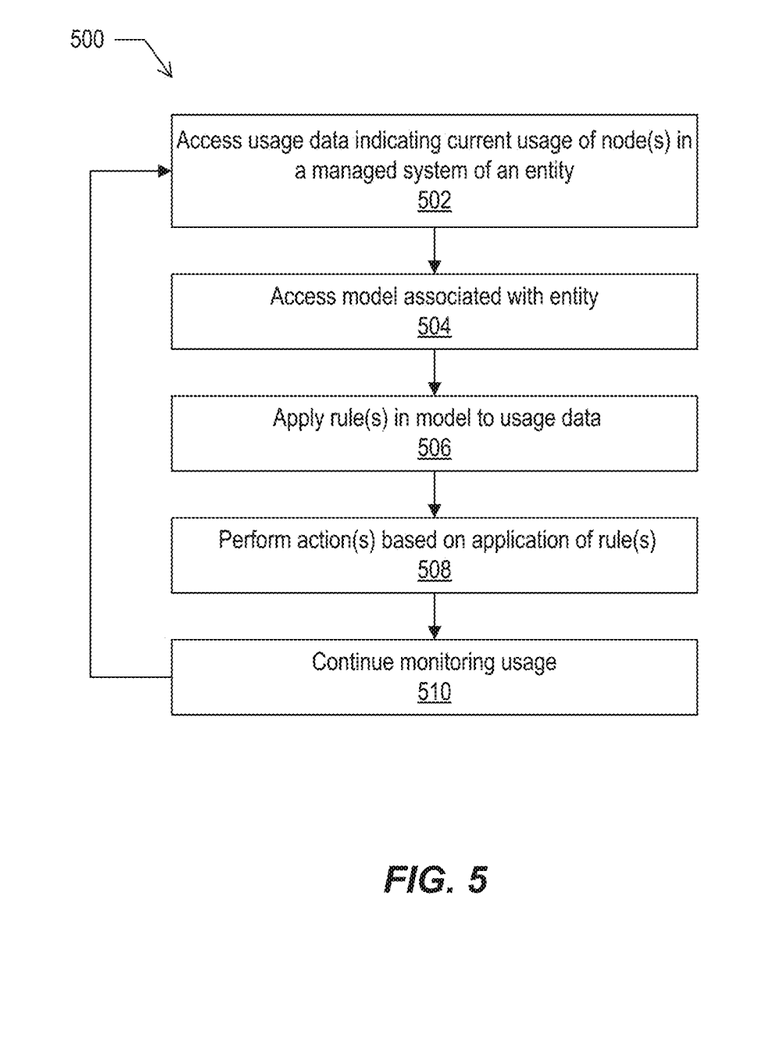
FIG. 5 depicts a flow diagram of an example process for managing a system of nodes, according to implementations of the present disclosure.

FIG. 5 depicts a flow diagram 500 of an example process for managing a system 402 of nodes 404, according to implementations of the present disclosure. Operations of the process can be performed by one or more of the control module(s) 116, the application(s) 122, and/or other software module(s) executing on the server device(s) 114, the user device(s) 120, or elsewhere.

Usage data can be accessed (502), indicating a current usage (e.g., units metric) of each of the node(s) 404 in the managed system 402. A model 118 associated with the entity for the managed system 402 can also be accessed (504). The rule(s) included in the model 118 can be applied (506) to the usage data, to determine whether the rules are satisfied or broken. In some implementations, rule(s) application can be periodic (e.g., every five seconds) and performed in real time with respect to the collection of the usage data. One or more action(s) can be performed (508) based on the application of the rule(s), as described above. Action(s) can be performed if rule(s) are violated, if rule(s) are satisfied, and/or different action(s) may be performed in either instance. The monitoring (510) of the usage data may continue. As described above, the action(s) may be performed in real time (e.g., dynamically) with respect to the receipt and analysis of the usage data and the application of the rule(s) to the usage data.

Figure 6:
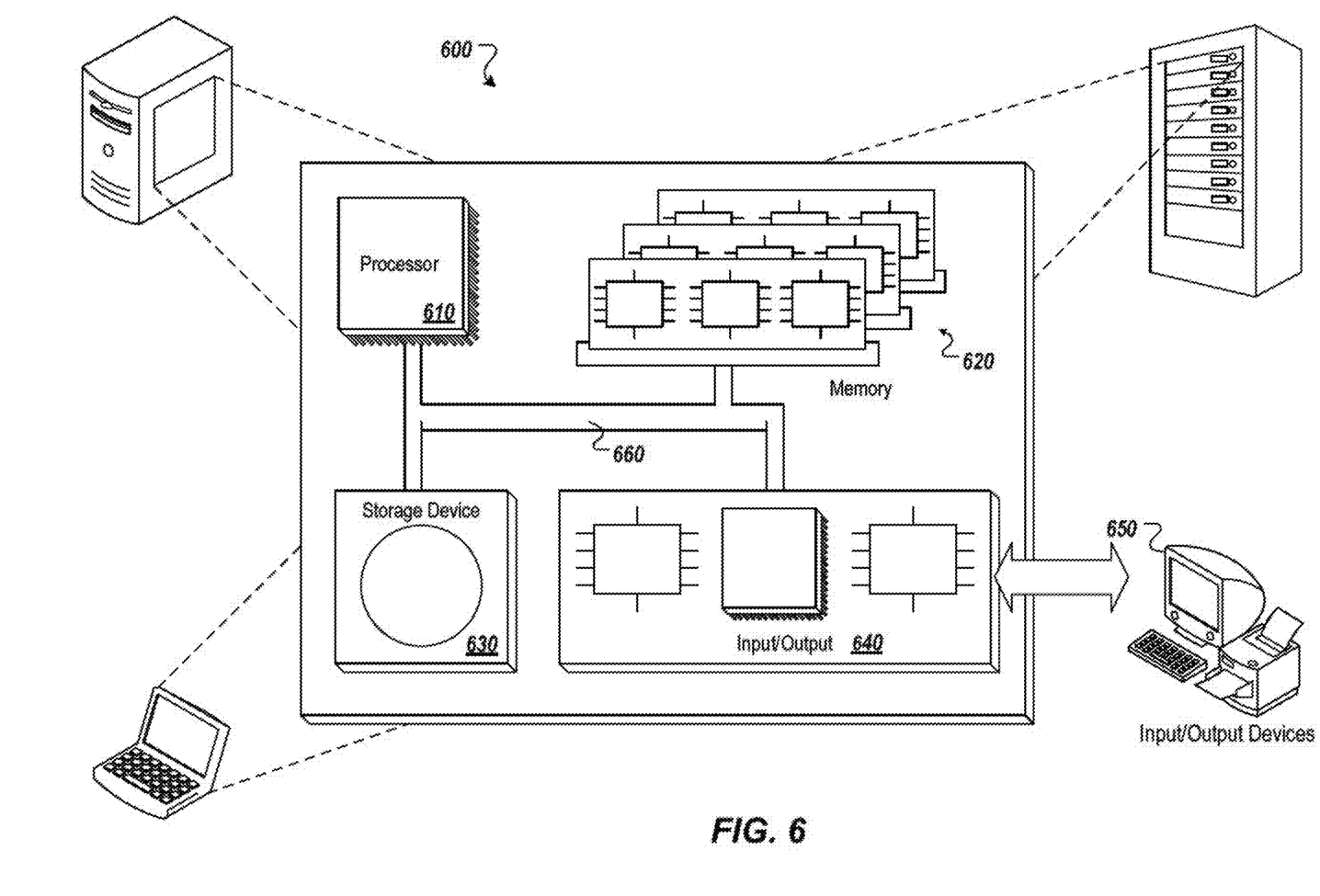
FIG. 6 depicts an example computing system, according to implementations of the present disclosure.

FIG. 6 depicts an example computing system, according to implementations of the present disclosure. The system 600 may be used for any of the operations described herein with respect to the various implementations discussed herein. For example, the system 600 may be included, at least in part, in one or more of the user device(s) 120, the server device(s) 114, the light source(s) 104, the controller(s) 106, the sensor(s) 108, the other device(s) 110, and/or other computing device(s) or system(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well, such as interaction through a touchscreen of a mobile computing device, audible commands through speech-based interactions, and so forth. For example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
    accessing, by the at least one processor, usage data indicating, for each of a plurality of devices in an environment that includes a lighting system, a units metric describing a current operation of a respective device of the plurality of devices;
    accessing, by the at least one processor, a model that includes one or more rules that constrain usage of the lighting system;
    applying, by the at least one processor, the one or more rules to the usage data; and
    dynamically performing, by the at least one processor, at least one action based on a result of applying the one or more rules to the usage data.

2. The method of claim 1, wherein the units metric indicates one or more of:
    an amount of power currently consumed by the respective device;
    an amount of illumination currently provided by the respective device; and
    a combination of the amount of power and the amount of illumination.

3. The method of claim 1, wherein:
    the one or more rules include a rule constraining a total of the units metrics for the plurality of devices according to a maximum units parameter for the lighting system; and
    the result indicates that the total of the units metrics exceeds the maximum units parameter.

4. The method of claim 3, wherein the at least one action includes transmitting a signal to alter operation of one or more of the plurality of devices to reduce the units metric of the one or more devices.

5. The method of claim 4, wherein the signal causes the one or more devices to perform one or more of:
    shut off the one or more devices;
    reduce a brightness of the illumination provided by the one or more devices; and
    reduce power consumption of the one or more devices.

6. The method of claim 3, wherein the at least one action includes:
    changing the maximum units parameter to be at least the total of the units metrics; and
    initiating a charge transaction to an entity associated with at least one of the lighting system and the environment.

7. The method of claim 6, wherein the maximum units parameter is changed for a limited period of time.

8. The method of claim 1, wherein the plurality of devices includes one or more of a lighting source, a sensor, and a controller.

9. A system comprising:
    at least one processor; and
    memory communicatively coupled to the at least one processor, the memory storing instructions which, when executed by the at least one processor, cause the at least one processor to perform operations comprising:
        accessing usage data indicating, for each of a plurality of devices in an environment that includes a lighting system, a units metric describing a current operation of a respective device of the plurality of devices;
        accessing a model that includes one or more rules that constrain usage of the lighting system;
        applying the one or more rules to the usage data; and
        dynamically performing at least one action based on a result of applying the one or more rules to the usage data.

10. The system of claim 9, wherein the units metric indicates one or more of:
    an amount of power currently consumed by the respective device;
    an amount of illumination currently provided by the respective device; and
    a combination of the amount of power and the amount of illumination.

11. The system of claim 9, wherein:
    the one or more rules include a rule constraining a total of the units metrics for the plurality of devices according to a maximum units parameter for the lighting system; and
    the result indicates that the total of the units metrics exceeds the maximum units parameter.

12. The system of claim 11, wherein the at least one action includes transmitting a signal to alter operation of one or more of the plurality of devices to reduce the units metric of the one or more devices.

13. The system of claim 12, wherein the signal causes the one or more devices to perform one or more of:
    shut off the one or more devices;
    reduce a brightness of the illumination provided by the one or more devices; and
    reduce power consumption of the one or more devices.

14. The system of claim 11, wherein the at least one action includes:
    changing the maximum units parameter to be at least the total of the units metrics; and
    initiating a charge transaction to an entity associated with at least one of the lighting system and the environment.

15. The system of claim 14, wherein the maximum units parameter is changed for a limited period of time.

16. The system of claim 11, wherein the plurality of devices includes one or more of a lighting source, a sensor, and a controller.

17. One or more computer-readable media storing instructions which, when executed by at least one processor, cause the at least one processor to perform operations comprising:
- accessing usage data indicating, for each of a plurality of devices in an environment that includes a lighting system, a units metric describing a current operation of a respective device of the plurality of devices;
- accessing a model that includes one or more rules that constrain usage of the lighting system;
- applying the one or more rules to the usage data; and
- dynamically performing at least one action based on a result of applying the one or more rules to the usage data.

18. The one or more computer-readable media of claim 17, wherein the units metric indicates one or more of:
- an amount of power currently consumed by the respective device;
- an amount of illumination currently provided by the respective device; and
- a combination of the amount of power and the amount of illumination.

19. The one or more computer-readable media of claim 17, wherein:
- the one or more rules include a rule constraining a total of the units metrics for the plurality of devices according to a maximum units parameter for the lighting system; and
- the result indicates that the total of the units metrics exceeds the maximum units parameter.

20. The one or more computer-readable media of claim 19, wherein the at least one action includes transmitting a signal to alter operation of one or more of the plurality of devices to reduce the units metric of the one or more devices.

* * * * *